United States Patent Office

Re. 25,188
Reissued June 19, 1962

25,188

ELECTRIC CABLE AND CONDENSER INSULATION INCLUDING FISCHER-TROPSCH WAX

Archibald Walter Thompson, Crayford, Kent, and Albert Sidney Freeborn, Bromley, Kent, England, assignors to Dussek Brothers & Company Limited, Crayford, England, a British company No Drawing. Original No. 2,857,350, dated Oct. 21, 1958, Ser. No. 358,978, June 1, 1953. Application for reissue Oct. 19, 1959, Ser. No. 847,442
Claims priority, application Great Britain Oct. 15, 1952
14 Claims. (Cl. 260—27)

Matter enclosed in heavy brackets [ ] appears in the original patent but forms no part of this reissue specification; matter printed in italics indicates the additions made by reissue.

This invention is for improvements in or relating to electric cables and condensers and has particular reference to impregnating compositions for use in the manufacture of cables and condensers in which the dielectric consists of fibrous material, for example paper tape, impregnated with an insulating composition.

It is known to impregnate paper tape or like fibrous materials employed for insulating purposes with insulating oils (by which are understood the oils normally used either alone or admixed with other constituents for the impregnation of the fibrous material employed as the dielectric in the manufacture of cables and condensers) in which are incorporated additives, e.g. polyisobutylene, to reduce or prevent the drainage of the impregnant from the windings of cables which are inclined to the horizontal. The process of impregnation must necessarily take place above the melting point of the impregnating compound and the cable removed from the impregnating compound before the latter solidifies. Previously known impregnating compositions either possess relatively low melting points or when they have higher melting points, e.g. above 85° C. (as measured by the Institute of Petroleum Standard Method I.P.—133/51, which is to be understood as used in any subsequent references to melting point), they contain such a large amount of wax as to render the windings brittle and to make the bending of paper-impregnated cables difficult without tearing the windings. Furthermore, at impregnating temperatures the viscosity of the known impregnating composition is so low that serious drainage from the cable takes place after impregnation and before the saturant becomes solid and thus the impulse strength of the finished cable is considerably reduced.

It is an object of the present invention to provide an impregnating composition the viscosity of which, at a temperature a little above its melting point, is sufficiently high to prevent serious drainage during manufacture or service and yet whose viscosity at the impregnating temperature, around 120° C., is not too high to prevent thorough impregnation.

We have now found that an insulating oil containing a proportion of a synthetic hydrocarbon wax and, if desired, a proportion of polyisobutylene and/or polyethylene has a high melting point, desirable plastic characteristics at low temperatures and a sufficiently high viscosity immediately above its melting point which viscosity is controllable within wide limits. Such a composition may contain less wax for the same melting point and non-drainage characteristics as known saturants and consequently will show reduced shrinkage on cooling and will result in reduced void formation in the dielectric with consequent reduction of gaseous ionisation and increased cable life.

According to the present invention a composition for the impregnation of fibrous material for the insulation of the conductors of cables or condensers comprises an insulating oil and a synthetic hydrocarbon wax with or without polyisobutylene and/or polyethylene.

The synthetic hydrocarbon wax is a wax of high melting point above 85° C. and preferably between 85° and 120° C., and of low dielectric loss. An example of a suitable synthetic wax is that known under the trade name "Super Hard Wax No. 105," which wax has a melting point of 108/110° C. and is a product of the Fischer Tropsch process. This wax has an average molecular weight of about 600 corresponding to $C_{40}$ and its boiling point under vacuum is above 460° C. A further example of a suitable synthetic wax is a synthetic wax produced by the hydrogenation of less saturated naturally occurring hydrocarbons.

The proportion of polyisobutylene and/or polyethylene in the impregnating composition, when employed, will depend upon the molecular weight of the polymer. Thus when low molecular weight polyisobutylene and/or polyethylene are used, e.g. polyisobutylene of approximate molecular weight 1200 known as Oronite 32, or Polythene Grade 200,000 of approximate molecular weight 2500, a proportion of up to 40% by weight on the weight of the impregnating composition may be used. When high molecular weight polyisobutylene and/or polyethylene are employed, e.g. polyisobutylene of approximate molecular weight 100,000, the proportion of polymer should not, in general, exceed 1% by weight on the weight of the impregnating composition. The proportion of synthetic hydrocarbon wax in the impregnating composition may be up to 60% by weight and preferably between 15% and 60% by weight on the weight of the composition.

There may be be included in the composition a proportion of petrolatum, rosin or other resins of low dielectric loss. Small proportions of oxidation inhibitors and metal deactivators may also be incorporated in the impregnating composition to prevent oxidation or deterioration thereof both during manufacture and in the finished cable or condenser.

The invention includes a process for the manufacture of a composition for cable and condenser impregnation as above described, which process comprises dissolving polyisobutylene and/or polyethylene in a synthetic hydrocarbon wax preferably in an inert atmosphere with agitation at an elevated temperature and thereafter adding the insulating oil to the mixture. Alternatively using the method of manufacture given in British patent specification No. 650,088, the polyisobutylene may be dissolved in a solvent and a mixture of insulating oil and synthetic hydrocarbon wax added thereto, the solvent then being removed.

The invention also includes cables and condensers the fibrous insulating layers whereof are impregnated with a composition as above described.

The following is a description by way of example of two methods of carrying the invention into effect.

EXAMPLE I 350 grams of "Super Hard Wax No. 105" having a melting point of 108/110° C. are melted in an atmosphere of nitrogen in a steam-jacketed vessel and the temperature then raised to 140° C. 32.5 grams of polyisobutylene of molecular weight 100,000 cut into small pieces, about ½ inch cubes, are then added to the molten wax with continuous stirring, the temperature of 140° C. and the atmosphere of nitrogen being maintained. When all the polyisobutylene has been dissolved 617.5 grams of a cable insulating oil of low dielectric loss and viscosity 900 Redwood seconds at 60° C. are added to the mixture and the whole stirred until homogeneous. The impregnating composition is then allowed to cool to 110° C. in the atmosphere of nitrogen and finally run off into suitable containers. The final compound has a Ubbelohde drop point of around 97° C.

EXAMPLE II

The method of manufacture given in British patent specification No. 650,088 is here followed. 32.5 grams of polyisobutylene are cut into small pieces and dissolved in 325 grams redistilled petroleum spirit (boiling range 120° to 140° C.) 617.5 grams of a cable insulating oil, viscosity 900 Redwood seconds at 60° C., are then mixed with 350 grams of "Super Hard Wax No. 105" and held at 120° C., in a vessel under vacuum. The polyisobutylene solution is then mixed with the insulating oil and wax and the mixture circulated at 120° C., under vacuum to the top of a tower where the mixture is broken up into droplets and allowed to fall to the bottom of the tower. Saturated steam at 140° C. is blown in at the base of the tower and steam and solvent are carried along the vacuum line to be subsequently condensed. The impregnating composition collecting at the base of the tower is recirculated until all the solvent has been removed when it is passed into storage vessels.

To facilitate the removal of the petroleum spirit it is desirable to allow liquid to build up in the base of the tower to a depth of about ⅓ of the height of the tower and the saturated steam is then bubbled through the liquid which is preferably heated by independent steam coils containing saturated steam at 140° C.

A typical method of impregnating a cable with the new composition is as follows. The molten impregnating composition, which has previously been dried and degassed is passed at 120° C. into an impregnation vessel containing the dried paper-wound cable conductor under vacuum. The impregnating composition is allowed to remain covering the cable until impregnation is complete then the whole is cooled to 110° C., the vacuum broken and the impregnated cable removed and lead sheathed.

EXAMPLE III 150 grams of "Super Hard Wax No. 105," 250 grams polyisobutylene of molecular weight 1200 and 600 grams of a cable insulating oil of viscosity 500 Redwood seconds at 60° C. are mixed together. The resulting impregnating composition had a melting point of 84° C.

The dielectric properties of impregnating compositions made in accordance with the present invention are good at all temperatures. The viscosity above the fusion point of the composition is increased as the percentage of polyisobutylene is increased and decreased with increasing synthetic wax content.

We claim:

[1. A composition for the impregnation of fibrous material for the insulation of the conductors of cables which composition comprises a cable impregnating mineral oil containing between 15% and 60% by weight of a synthetic Fischer Tropsch hydrocarbon wax having a molecular weight of approximately 600, a melting point between 85° and 120° C. and low dielectric loss, together with from 1% to 40% by weight of at least one compound selected from the group consisting of polyisobutylene having a molecular weight of approximately 100,000 and polyethylene having a molecular weight of approximately 2500.]

[2. A composition for the impregnation of fibrous material for the insulation of the conductors of cables which composition comprises a cable impregnating mineral oil and from 15% to 60% by weight of a synthetic Fischer Tropsch hydrocarbon wax having a molecular weight of approximately 600, a melting point between 85° and 120° C. and low dielectric loss, together with from 1% to 40% by weight of at least one compound selected from the group of polyisobutylene having a molecular weight of approximately 100,000 and polyethylene having a molecular weight of approximately 2500 and petrolatum.]

3. A composition for the impregnation of fibrous material for the insulation of the conductors of cables which composition comprises a cable impregnating mineral oil and from 15% to 60% by weight of a synthetic Fischer Tropsch hydrocarbon wax having a molecular weight of approximately 600, a melting point between 85° and 120° C. and low dielectric loss, together with from 1% to 40% by weight of rosin.

[4. A composition for the impregnation of fibrous material for the insulation of the conductors of cables which composition comprises a cable impregnating mineral containing between 15% and 60% by weight of a synthetic Fischer Tropsch hydrocarbon wax having a molecular weight of approximately 600, a melting point between 85° and 120° C. and low dielectric loss, together with from 1% to 40% by weight of at least one compound selected from the group consisting of polyisobutylene having a molecular weight of approximately 100,000 and polyethylene having a molecular weight of approximately 2500 and up to 40% by weight of petrolatum.]

[5. A composition for the impregnation of fibrous material for the insulation of the conductors of cables which composition comprises a cable impregnating mineral containing between 15% and 60% by weight of a synthetic Fischer Tropsch hydrocarbon wax having a molecular weight of approximately 600, a melting point between 85° and 120° C. and low dielectric loss, together with from 1% to 40% by weight of at least one compound selected from the group consisting of polyisobutylene having a molecular weight of approximately 100,000 and polyethylene having a molecular weight of approximately 2500 and up to 40% by weight of rosin.]

[6. A process for the manufacture of a composition for cable impregnation which process comprises dissolving from 1% to 40% by weight of at least one compound selected from the group consisting of polyisobutylene having a molecular weight of approximately 100,000 and polyethylene having a molecular weight of approximately 2500 in from 15% to 60% by weight of a synthetic Fischer Tropsch hydrocarbon wax having a molecular weight of approximately 600, a melting point between 80° and 120° C. and low dielectric loss in an inert atmosphere with agitation at a temperature from 110° to 140° C. and thereafter adding a cable impregnating mineral oil to the mixture.]

[7. A process for the manufacture of a composition for cable impregnation which process comprises dissolving from 10% to 40% by weight of polyisobutylene having a molecular weight of approximately 100,000 in a solvent and adding thereto a mixture of a cable impregnating mineral oil and from 15% to 60% by weight of a synthetic Fischer Tropsch hydrocarbon wax having an average molecular weight of about 600, a melting point between 85° and 120° C. and low dielectric loss, the solvent then being removed.]

*8. A composition for the impregnation of fibrous material for the insulation of the conductors of cables which composition comprises a cable impregnating mineral oil containing between 15% and 60% by weight of a synthetic Fischer Tropsch hydrocarbon wax having a molecular weight of approximately 600, a melting point between 85° and 120° C. and low dielectric loss, together with from 1% to 40% by weight of at least one compound selected from the group consisting of polyisobutylene having a molecular weight of approximately 1200 to 100,000 and polyethylene having a molecular weight of at least approximately 2500.*

*9. A composition for the impregnation of fibrous material for the insulation of the conductors of cables which composition comprises a cable impregnating mineral oil and from 15% to 60% by weight of a synthetic Fischer Tropsch hydrocarbon wax having a molecular weight of approximately 600, a melting point between 85° and 120° C. and low dielectric loss, together with from 1% to 40% by weight of at least one compound selected from the group*

*of polyisobutylene having a molecular weight of approximately 1200 to 100,000 and polyethylene having a molecular weight of at least approximately 2500 and petrolatum.*

*10. A composition for the impregnation of fibrous material for the insulation of the conductors of cables which composition comprises a cable impregnating mineral oil containing between 15% and 60% by weight of a synthetic Fischer Tropsch hydrocarbon wax having a molecular weight of approximately 600, a melting point between 85° and 120° C. and low dielectric loss, together with from 1% to 40% by weight of at least one compound selected from the group consisting of polyisobutylene having a molecular weight of approximately 1200 to 100,000 and polyethylene having a molecular weight of at least approximately 2500 and up to 40% by weight of petrolatum.*

*11. A composition for the impregnation of fibrous material for the insulation of the conductors of cables which composition comprises a cable impregnating mineral oil containing between 15% and 60% by weight of a synthetic Fischer Tropsch hydrocarbon wax having a molecular weight of approximately 600, a melting point between 85° and 120° C. and low dielectric loss, together with from 1% to 40% by weight of at least one compound selected from the group consisting of polyisobutylene having a molecular weight of approximately 1200 to 100,000 and polyethylene having a molecular weight of at least approximately 2500 and up to 40% by weight of rosin.*

*12. A process for the manufacture of a composition for cable impregnation which process comprises dissolving from 1% to 40% by weight of at least one compound selected from the group consisting of polyisobutylene having a molecular weight of approximately 1200 to 100,000 and polyethylene having a molecular weight of at least approximately 2500 in from 15% to 60% by weight of a synthetic Fischer Tropsch hydrocarbon wax having a molecular weight of approximately 600, a melting point between 85° and 120° C. and low dielectric loss in an inert atmosphere with agitation at a temperature from 110° to 140° C. and thereafter adding a cable impregnating mineral oil to the mixture.*

*13. A process for the manufacture of a composition for cable impregnation which process comprises dissolving from 1% to 40% by weight of polyisobutylene having a molecular weight of approximately 1200 to 100,000 in a solvent and adding thereto a mixture of a cable impregnating mineral oil and from 15% to 60% by weight of a synthetic Fischer Tropsch hydrocarbon wax having an average molecular weight of about 600, a melting point between 85° and 120° C. and low dielectric loss, the solvent then being removed.*

*14. A composition for the impregnation of fibrous material for the insulation of the conductors of cables which composition comprises a cable impregnating mineral oil containing between 15% and 60% by weight of a synthetic Fischer Tropsch hydrocarbon wax having a melting point between 85° and 120° C. and low dielectric loss, together with from 1% to 40% by weight of at least one compound selected from the group consisting of polyisobutylene having a molecular weight of approximately 1200 to 100,000 and polyethylene having a molecular weight of at least approximately 2500.*

*15. A composition for the impregnation of fibrous material for the insulation of the conductors of cables which composition comprises a cable impregnating mineral oil and from 15% to 60% by weight of a synthetic Fischer Tropsch hydrocarbon wax having a melting point between 85° and 120° C. and low dielectric loss, together with fro 1% to 40% by weight of at least one compound selecte from the group of polyisobutylene having a molecul weight of approximately 1200 to 100,000 and polyethyler having a molecular weight of at least approximately 25( and petrolatum.*

*16. A composition for the impregnation of fibrous mat rial for the insulation of the conductors of cables whic composition comprises a cable impregnating mineral c and from 15% and 60% by weight of a synthetic Fisch Trospch hydrocarbon wax having a melting point betwe 85° and 120° C. and low dielectric loss, together wi from 1% to 40% by weight of rosin.*

*17. A composition for the impregnation of fibrous mat rial for the insulation of the conductors of cables whic composition comprises a cable impregnating mineral c containing between 15% and 60% by weight of a synthet Fischer Tropsch hydrocarbon wax having a melting poi between 85° and 120° C. and low dielectric loss, togeth with from 1% to 40% by weight of at least one compou selected from the group consisting of polyisobutylene ha ing a molecular weight of approximately 1200 to 100,0( and polyethylene having a molecular weight of at least a proximately 2500 and up to 40% by weight of petrol tum.*

*18. A composition for the impregnation of fibrous mat rial for the insulation of the conductors of cables whi composition comprises a cable impregnating mineral c containing between 15% and 60% by weight of a sy thetic Fischer Tropsch hydrocarbon wax having a melti point between 85° and 120° C. and low dielectric lo, together with from 1% to 40% by weight of at least o compound selected from the group consisting of polyis butylene having a molecular weight of approximate 1200 to 100,000 and polyethylene having a molecul weight of at least approximately 2500 and up to 40 by weight of rosin.*

*19. A process for the manufacture of a compositi for cable impregnation which process comprises disso ing from 1% to 40% by weight of at least one compou selected from the group consisting of polyisobutylene ha ing a molecular weight of approximately 1200 to 100,0 and polyethylene having a molecular weight of at le approximately 2500 in from 15% to 60% by weight o synthetic Fischer Tropsch hydrocarbon wax having melting point between 85° and 120° C. and low diel tric loss in an inert atmosphere with agitation at a te perature from 110° to 140° C. and thereafter adding cable impregnating mineral oil to the mixture.*

*20. A process for the manufacture of a compositi for cable impregnation which process comprises disso ing from 1% to 40% by weight of polyisobutylene havi a molecular weight of approximately 1200 to 100,000 a solvent and adding thereto a mixture of a cable i pregnating mineral oil and from 15% to 60% by weight a synthetic Fischer Tropsch hydrocarbon wax having melting point between 85° and 120° C. and low diel tric loss, the solvent then being removed.*

References Cited in the file of this patent or the original patent

UNITED STATES PATENTS

| | | |
|---|---|---|
| 2,050,428 | Diggs et al. | Aug. 11, 19 |
| 2,499,756 | Jacobson | Mar. 7, 19 |
| 2,586,345 | King | Feb. 19, 19 |
| 2,594,547 | Fischer | Apr. 29, 19 |
| 2,867,596 | Bennett | June 6, 19 |